United States Patent
Racca

(10) Patent No.: US 10,125,702 B2
(45) Date of Patent: Nov. 13, 2018

(54) METHOD OF OPERATING AN INTERNAL COMBUSTION ENGINE HAVING A TURBOCHARGER

(71) Applicant: GM GLOBAL TECHNOLOGY OPERATIONS LLC, Detroit, MI (US)

(72) Inventor: Alberto Racca, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 15/452,206

(22) Filed: Mar. 7, 2017

(65) Prior Publication Data

US 2018/0258870 A1  Sep. 13, 2018

(51) Int. Cl.
- *F02D 41/00* (2006.01)
- *F02M 26/06* (2016.01)
- *F02M 26/25* (2016.01)
- *F02M 26/32* (2016.01)
- *F02M 26/33* (2016.01)

(52) U.S. Cl.
CPC ..... *F02D 41/0065* (2013.01); *F02D 41/0047* (2013.01); *F02M 26/06* (2016.02); *F02M 26/25* (2016.02); *F02M 26/32* (2016.02); *F02M 26/33* (2016.02); *F02D 2041/0067* (2013.01)

(58) Field of Classification Search
CPC ........ F02M 26/05; F02M 26/06; F02M 26/07; F02M 26/25; F02M 26/32; F02M 26/11; F02M 26/33; F02D 41/0065; F02D 41/0047; F02D 2041/0067
See application file for complete search history.

(56) References Cited

U.S. PATENT DOCUMENTS

| | | |
|---|---|---|
| 2011/0132334 A1* | 6/2011 | Lippa ............... F02B 37/18 123/556 |
| 2016/0097320 A1* | 4/2016 | Ohrem ............... F02M 26/05 60/599 |
| 2017/0101968 A1* | 4/2017 | Hayashi ........... F02D 41/0065 |
| 2017/0328263 A1* | 11/2017 | Uhrich ............... F01P 3/20 |

FOREIGN PATENT DOCUMENTS

| | | | | |
|---|---|---|---|---|
| DE | 102005050234 A1 * | 4/2007 | ........ | F28F 7/02 |
| FR | 3030636 A1 * | 6/2016 | ........ | F01N 3/021 |

* cited by examiner

*Primary Examiner* — Thai Ba Trieu
*Assistant Examiner* — Jessica Kebea
(74) *Attorney, Agent, or Firm* — Lorenz & Kopf, LLP

(57) ABSTRACT

A method and apparatus are disclosed for operating an internal combustion engine equipped with a turbocharger and an exhaust gas recirculation pipe fluidly connecting an exhaust gas line to an air intake duct upstream of a compressor of the turbocharger. A value of a parameter indicative of a temperature of a portion of the exhaust gas recirculation pipe is determined. Exhaust gas recirculation via the exhaust gas recirculation pipe is prevented when the determined value is lower than a predetermined threshold value thereof. The air intake duct portion of compressed air exiting from the compressor is recirculated via the portion of the exhaust gas recirculation pipe.

11 Claims, 3 Drawing Sheets

METHOD OF OPERATING AN INTERNAL COMBUSTION ENGINE HAVING A TURBOCHARGER

TECHNICAL FIELD

The present disclosure pertains to a method of operating an internal combustion engine of a motor vehicle, for example a compression-ignition engine (e.g. Diesel), wherein the internal combustion engine has a turbocharger.

BACKGROUND

An internal combustion engine (ICE) generally includes an air intake system, which includes an intake manifold and an air duct for conveying fresh air from the environment into the intake manifold, an exhaust system, which includes an exhaust manifold for collecting the exhaust gasses and directing them to an exhaust gas line that conveys the exhaust gasses to the environment, and a turbocharger, which includes a compressor located in the air intake system for compressing the air stream flowing therein and a turbine located in the exhaust system for driving the compressor.

In order to reduce the polluting emissions, some internal combustion engines, having a turbocharger, are provided with a long-route exhaust gas recirculation (EGR) system, for selectively routing back exhaust gas from the exhaust system into the air duct of the air intake system. In such a way the exhaust gas mixed with the fresh air is admitted into the engine cylinders, in order to reduce the production of nitrogen oxides ($NO_x$) during the combustion process. In details, long-route EGR systems include an EGR pipe, which fluidly connects the exhaust system with the air duct upstream of the compressor of the turbocharger, an EGR cooler located in the EGR pipe, and a valve regulating the flow rate of exhaust gas through the EGR pipe.

A drawback of the long-route EGR systems is due to potential condensation in cold environmental condition. Indeed, during the engine warm-up phase in cold environmental condition it happens that exhaust gas condensates in the EGR pipe, generating droplets which flow against the compressor wheel.

SUMMARY

In accordance with the present disclosure the condensation of the recirculated exhaust gas is prevented and thus the compressor is protected from the condensation droplets that can be generated that way in any operating condition of the ICE and, at the same time, allowing an earlier efficient activation of the long route EGR system.

In particular, an aspect of the present disclosure provides a method of operating an internal combustion engine equipped with a turbocharger and an exhaust gas recirculation pipe fluidly connecting an exhaust gas line to an air intake duct upstream of a compressor of the turbocharger. A value of a parameter indicative of a temperature of a portion of the exhaust gas recirculation pipe is determined. Exhaust gas recirculation via the exhaust gas recirculation pipe is prevented if the determined value is lower than a predetermined threshold value thereof. The air intake duct part of compressed air exiting is recirculated from the compressor via the portion of the exhaust gas recirculation pipe.

Thank to this solution, a part of the compressed air exiting from the compressor, which due to the compression has a temperature which is higher than the temperature of the environmental ambient air entering the intake duct, may be deviated into the portion of the exhaust gas recirculation pipe, allowing a preheating of the internal walls of the same portion. In this way, the exhaust gas recirculation through this portion may be allowed (free of condensation risks) once the temperature has increased up to a critical value, namely a temperature value which prevents condensation of the exhaust gas.

Therefore, it is possible to provide a condensation preventing strategy which avoids condensation droplets, which can impact the compressor wheel of the turbocharger, also in severe environment conditions, namely in conditions of very cold ambient temperatures at engine start. Again, thanks to this solution, the warm-up of the exhaust system, for example after a cold start of the internal combustion engine (and/or in cold environmental condition), may be faster and safer with respect to the known methods. Furthermore, thanks to the faster warm-up phase, for example after a cold start of the internal combustion engine, the recirculation of the exhaust gas through the exhaust gas recirculation pipe of the long-route exhaust gas recirculation system may be allowed earlier with respect to the known methods. Moreover, a quick warm-up of the portion guarantees an early activation of the long-route exhaust gas recirculation system allowing to reduce the usage of the short-route exhaust gas recirculation system.

An embodiment of the present disclosure provides that the parameter may be a temperature value of a wall of the portion of the exhaust gas recirculation pipe. As a matter of fact, this aspect of the present disclosure provides a reliable solution for determining a potential condensation in the mixture of fresh air and exhaust gas which passes the portion and is directed toward the compressor.

An embodiment of the present disclosure provides that the method may include determining a value of a parameter indicative of a temperature of a coolant in an exhaust gas cooler, preventing compressed air recirculation through the portion of the exhaust gas recirculation pipe, if the determined value of the parameter indicative of the temperature of the coolant is lower than a predetermined threshold value thereof and if the value of the parameter indicative of the temperature of the portion of the exhaust gas recirculation pipe is higher than the predetermined threshold value thereof, and recirculating exhaust gas to the air intake duct via the portion of the exhaust gas recirculation pipe bypassing the exhaust gas cooler. Thanks to this solution, once the portion of the exhaust gas recirculation pipe has been warmed up, the exhaust gas recirculation may quickly start through the heated portion, preventing the condensation risks and reaching the benefits in terms of fuel consumption.

An embodiment of the present disclosure provides that the method may include preventing compressed air recirculation through the portion of the exhaust gas recirculation pipe, if the determined value of the parameter indicative of the temperature of the coolant is higher than the predetermined threshold value thereof, and recirculating exhaust gas to the air intake duct via the exhaust gas cooler. Thanks to this solution, when the coolant temperature is sufficiently high, the exhaust gas recirculation may quickly start through the exhaust gas cooler after a cold start of the engine, allowing to reach fast a steady state condition of the exhaust gas system.

The proposed solution, achieving basically the same effects of the method described above, may be carried out with the help of a computer program including a program-code for carrying out, when run on a computer, all the steps of the method described above, and in the form of a computer program product including the computer program.

The method can be also embodied as an electromagnetic signal; the signal being modulated to carry a sequence of data bits which represent a computer program to carry out all steps of the method.

Another aspect of the present disclosure provides an internal combustion engine having a turbocharger, an exhaust gas recirculation pipe provided with an exhaust gas recirculation valve and fluidly connecting an exhaust gas line to an air intake duct upstream of a compressor of the turbocharger, an air recirculation pipe provided with an air recirculation valve and fluidly connecting the air intake duct downstream of the compressor and a portion of the exhaust gas recirculation pipe downstream of the exhaust gas recirculation valve, and an electronic control unit configured to determine a value of a parameter indicative of a temperature of the portion of the exhaust gas recirculation pipe, actuate the exhaust gas recirculation valve to close the exhaust gas recirculation pipe, if the determined value is lower than a first predetermined threshold value thereof, and operate the air recirculation valve to open the air recirculation pipe and recirculate to the air intake duct part of compressed air exiting from the compressor via the portion of the exhaust gas recirculation pipe.

This solution achieves essentially the same effects of the method described above and, in particular, an efficient condensation preventing strategy and an early activation of the exhaust gas recirculation through the exhaust gas recirculation pipe of the long-route exhaust gas recirculation system.

An embodiment of the present disclosure provides that the exhaust gas recirculation pipe may include an exhaust gas cooler. A portion of the exhaust gas recirculation pipe connects the exhaust gas recirculation valve to a bypass branching point of the exhaust gas recirculation pipe bypassing the exhaust gas cooler. The bypass branching point, for instance, is located downstream of the exhaust gas cooler. Thanks to this solution, a faster warm-up of the exhaust gas recirculation pipe may be reached and an earlier exhaust gas recirculation may be achieved.

An embodiment of the present disclosure provides that the exhaust gas recirculation valve may be selectively operable among the closed position. The exhaust gas recirculation valve closes both the portions of the exhaust gas recirculation pipe and the exhaust gas cooler, a first open position, wherein the exhaust gas recirculation valve opens the portion of the exhaust gas recirculation pipe and closes the exhaust gas cooler, and a second open position, wherein the exhaust gas recirculation valve closes the portion of the exhaust gas recirculation pipe and opens the exhaust gas cooler. Thanks to this solution, an efficient warm-up and an earlier activation of the exhaust gas recirculation (preventing the condensation of the exhaust gas) may be achieved with minimum layout modifications of the exhaust gas recirculation system.

An embodiment of the present disclosure provides that the electronic control unit may be also configured to determine a value of a parameter indicative of a temperature of a coolant in the exhaust gas cooler, actuate the exhaust gas recirculation valve in the first open position, if the determined value of the parameter indicative of the temperature of the coolant is lower than a predetermined threshold value thereof and if the value of the parameter indicative of the temperature of the portion of the exhaust gas recirculation pipe is higher than the predetermined threshold value thereof, and operate the air recirculation valve to close the air recirculation pipe. Thanks to this solution, once the portion of the exhaust gas recirculation pipe has been warmed up, the exhaust gas recirculation may quickly start through the heated portion, preventing the condensation risks and reaching the benefits in terms of fuel consumption.

An embodiment of the present disclosure provides that the electronic control unit may be also configured to actuate the exhaust gas recirculation valve in the second open position, if the determined value of the parameter indicative of the temperature of the coolant is higher than the predetermined threshold value thereof. Thanks to this solution, when the coolant temperature is sufficiently high, the exhaust gas recirculation may quickly start through the exhaust gas cooler after a cold start of the engine, allowing to reach a steady state condition of the exhaust gas system.

An embodiment of the present disclosure provides that the portion of the exhaust gas recirculation pipe may include an inner layer and an outer layer. The inner layer has a thermal conductivity greater than the outer layer. By way of an example, the inner layer may be coaxially fixed to the outer layer, in particular the inner layer may be spaced apart from the outer layer. Thanks to this solution, the inner layer, which is contact with the flow of the compressed and heated air flowing into the portion, may have a faster warm-up allowing an earlier activation of the exhaust gas recirculation therein. Structural functions may be fulfilled by the outer layer.

Another aspect of the present disclosure provides an apparatus for operating an internal combustion engine equipped with a turbocharger and an exhaust gas recirculation pipe fluidly connecting an exhaust gas line to an air intake duct upstream of a compressor of the turbocharger. The apparatus is configured to determine a value of a parameter indicative of a temperature of a portion of the exhaust gas recirculation pipe, prevent exhaust gas recirculation via the exhaust gas recirculation pipe, if the determined value is lower than a predetermined threshold value thereof, and recirculate to the air intake duct part of compressed air exiting from the compressor via the portion of the exhaust gas recirculation pipe. This solution achieves essentially the same effects of the method described above and, in particular, an efficient condensation preventing strategy and an early activation of the exhaust gas recirculation through the exhaust gas recirculation pipe of the long-route exhaust gas recirculation system.

An embodiment of the present disclosure provides that the apparatus may further be configured to determine a value of a parameter indicative of a temperature of a coolant in an exhaust gas cooler. prevent compressed air recirculation through the portion of the exhaust gas recirculation pipe, if the determined value of the parameter indicative of the temperature of the coolant is lower than a predetermined threshold value thereof and if the value of the parameter indicative of the temperature of the portion of the exhaust gas recirculation pipe is higher than the predetermined threshold value thereof, and recirculate exhaust gas to the air intake duct via the portion of the exhaust gas recirculation pipe bypassing the exhaust gas cooler. Thanks to this solution, once the portion of the exhaust gas recirculation pipe has been warmed up, the exhaust gas recirculation may quickly start through the heated portion, preventing the condensation risks and reaching the benefits in terms of fuel consumption.

An embodiment of the present disclosure provides that the apparatus may further be configured to prevent compressed air recirculation through the portion of the exhaust gas recirculation pipe, if the determined value of the parameter indicative of the temperature of the coolant is higher than the predetermined threshold value thereof, and recirculate exhaust gas to the air intake duct via the exhaust gas cooler. Thanks to this solution, when the coolant temperature is sufficiently high, the exhaust gas recirculation may quickly start through the exhaust gas cooler after a cold start of the engine allowing to reach a steady state condition of the exhaust gas system.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
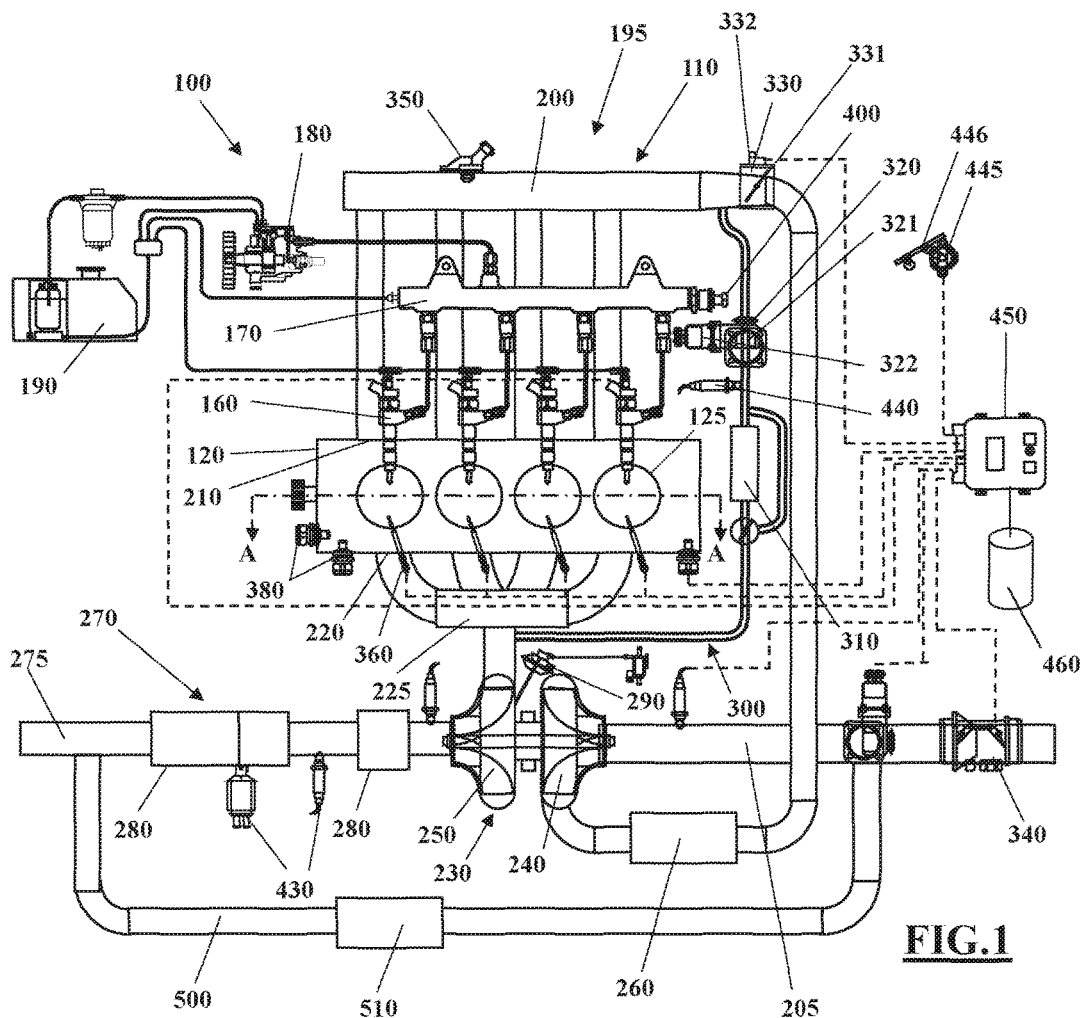
FIG. 1 schematically shows an automotive system.
Figure 2:
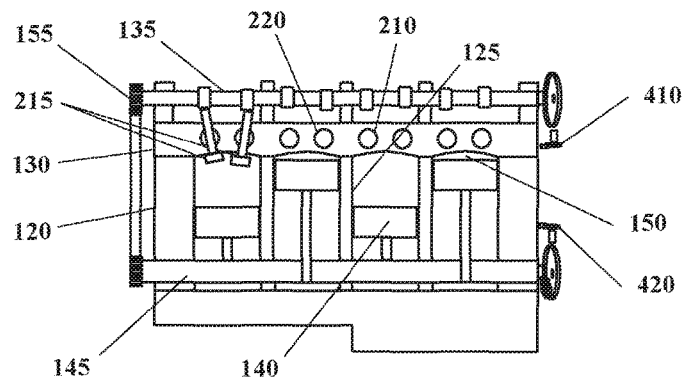
FIG. 2 is section A-A of FIG. 1.

Some embodiments may include an automotive system 100, as shown in FIGS. 1 and 2, that includes an internal combustion engine (ICE) 110, for example a compression-ignition engine (e.g. Diesel) or a spark-ignition engine (e.g. gasoline). The ICE 110 have an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be provided to the air intake port(s) 210 through an air intake system 195. The air intake system 195 may include an intake manifold 200 in communication with the air intake port(s) 210 and an air intake duct 205 providing air from the ambient environment to the intake manifold 200. A throttle body 330 may be disposed in the intake duct 205. The throttle body 330 may include a movable valve member 331 and an electrical actuator 332 that moves the valve member 331 to regulate the mass flow rate of the air directed into the manifold 200.

The air intake system 195 cooperates with a turbocharger 230, such as for example a variable-geometry turbocharger, having a compressor 240 rotationally coupled to a turbine 250, wherein the compressor 240 is located in the intake duct 205 and the turbine in the exhaust gas line 275. Rotation of the (wheel of) compressor 240 increases the pressure and temperature of the air in the intake duct 205 and manifold 200. An intercooler 260, disposed in the intake duct 205 between the compressor 240 and the intake manifold 200, may reduce the temperature of the air. The turbine 250 rotates by receiving exhaust gases from the exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes of the turbine 250 to alter the flow of the exhaust gases through it.

The exhaust gases coming from the combustion chamber 150 are directed into an exhaust gas system 270. The exhaust gas system 270 may include an exhaust manifold 225 in fluid communication with the exhaust port(s) 220, which collects the exhaust gases and directs them into an exhaust gas line 275 having one or more exhaust after-treatment devices 280. The after-treatment devices 280 may be any device configured to change the composition of the exhaust gases. Some examples of after-treatment devices 280 include, but are not limited to, catalytic converters (two and three ways), oxidation catalysts, lean NOx traps, hydrocarbon adsorbers, selective catalytic reduction (SCR) systems, and particulate filters.

Figure 3:
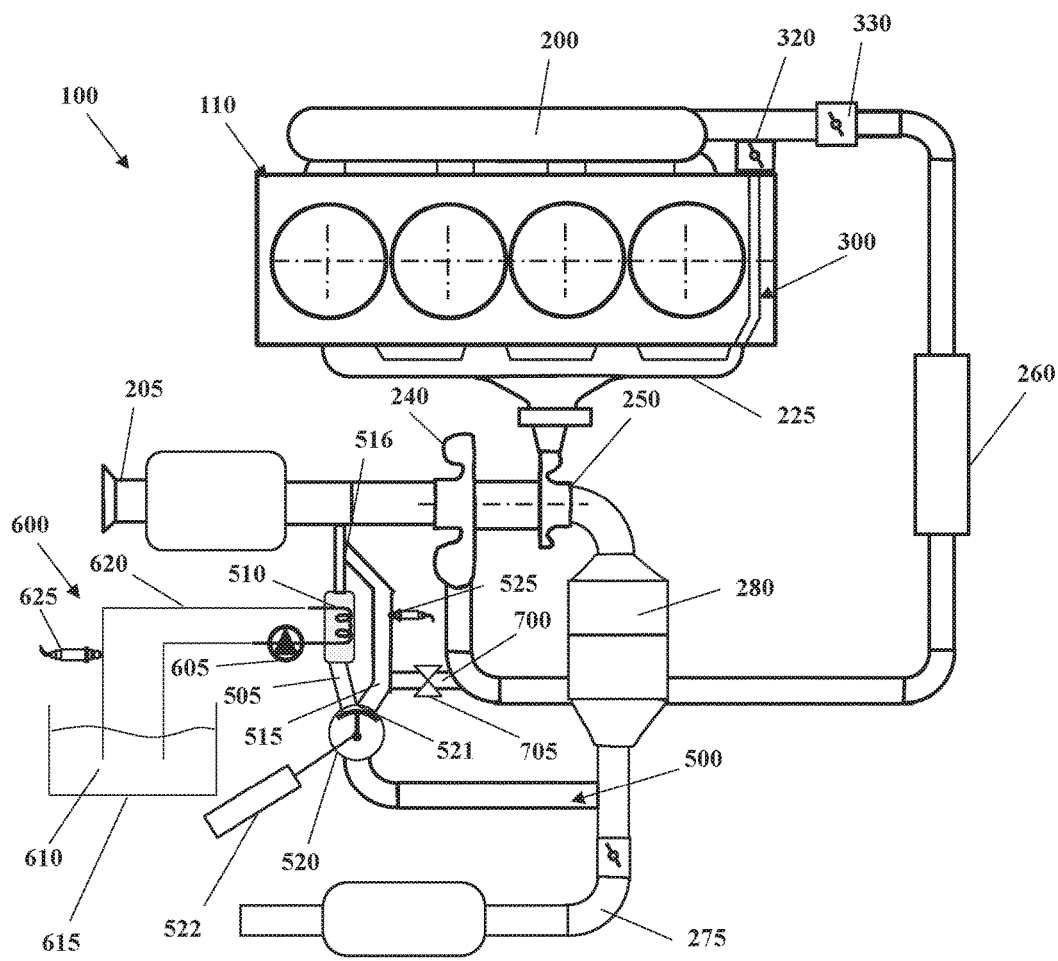
FIG. 3 is a schematic view of an internal combustion engine according to the present disclosure.

The ICE 110, as shown in FIG. 3, may be provided with an exhaust gas recirculation (EGR) system for recirculating part of the exhaust gases back into the combustion chamber 150.

The EGR system may include a short route, or high-pressure (HP) EGR portion. The HP-EGR portion includes an HP-EGR pipe 300 coupled between the exhaust manifold 225 and the intake manifold 200. More specifically, the HP-EGR pipe 300 branches from the exhaust manifold 225, or from a point of the exhaust gas line 275 located upstream of the turbine 250, and leads to a point of the intake duct 205 located downstream of the compressor 240, particularly between the intake manifold 200 and the throttle body 330. The HP-EGR pipe 300 may be provided with an HP-EGR cooler to reduce the temperature of the exhaust gases flowing therein. An HP-EGR valve 320 may be disposed in the HP-EGR pipe 300. The HP-EGR valve 320 may include a movable valve member and an electrical actuator that moves the valve member to regulate a mass flow rate of the exhaust gases in the HP-EGR pipe 300.

The EGR system may further include a long-route, or low-pressure (LP) EGR portion.

The LP-EGR portion includes a LP-EGR pipe 500 coupled between the exhaust manifold 225 and the intake manifold 200. More specifically, the LP-EGR pipe 500 branches from a point of the exhaust gas line 275 located downstream of the turbine 250, particularly downstream of the after-treatment devices 280 (for instance at least after the particulate filter), and leads in a point of the intake duct 205 located upstream of the compressor 240.

The LP-EGR pipe 500 may include a main duct 505. The LP-EGR pipe 500, in particular the main duct 505 thereof, may be provided with a LP-EGR cooler 510 to reduce the temperature of the exhaust gases flowing therein. The LP-EGR cooler 510 may be connected to an engine cooling circuit for cooling the ICE 110 or an independent cooling circuit. The cooling circuit 600 schematically includes a coolant pump 605 that delivers a coolant 610, typically water or a mixture of water and antifreeze, from a coolant tank 615 to at least a cooling tube or channel 620 internally defined by the LP-EGR cooler 510. The LP-EGR pipe 500 may further include a by-pass duct 515, namely an EGR cooler by-pass duct, constituting a portion of the LP-EGR pipe 500 and suitable to by-pass the LP-EGR cooler 510.

A LP-EGR valve 520 may be disposed in the LP-EGR pipe 500. The LP-EGR valve 520 may include a movable valve member 521 and an electrical actuator 522 that moves the valve member 521 to regulate a mass flow rate of the exhaust gases in the LP-EGR pipe 500. In particular, the LP-EGR valve 520 may be a three-port valve having an inlet communicating with an upstream section of the LP-EGR pipe 500 branching from the above the point of the exhaust gas line 275, a first outlet communicating with the main duct 505 and a second outlet communicating with the by-pass duct 515. In practice, the LP-EGR cooler 510 is provided on the main duct 505 downstream of the LP-EGR valve 520.

The valve member 521 of the LP-EGR valve 520 may be operated among a closed position, wherein the valve member 521 blocks both the main duct 505 and the by-pass duct 515 (namely, blocking both the first and second outlets and/or the inlet), a first open position, wherein the valve member 521 opens the by-pass duct 515 (fluidly connecting the upstream section of the LP-EGR pipe 500 and the by-pass duct 515) and closes the main duct 505 (namely blocking the first outlet only), and a second open position, wherein the valve member 521 closes the by-pass duct 515 (namely, blocking the second outlet only) and opens the main duct 505 (fluidly connecting the upstream section of the LP-EGR pipe 500 and the main duct 505 only).

The by-pass duct 515 connects the LP-EGR valve 520 to a bypass branching point 516 of the LP-EGR pipe 500, namely of the main duct 505 thereof, located downstream of the LP-EGR cooler 510 and, for instance, upstream of the connection between the LP-EGR pipe 500 and the intake duct 205.

Figures 4A, 4B:
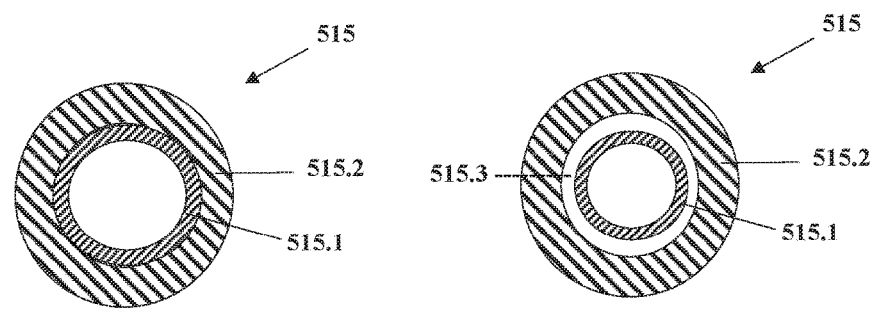
FIG. 4A is a schematic cross section of a portion of an exhaust gas recirculation pipe according to a first embodiment of the present disclosure.
FIG. 4B is a schematic cross section of a portion of an exhaust gas recirculation pipe according to a second embodiment of the present disclosure.
Figure 5:
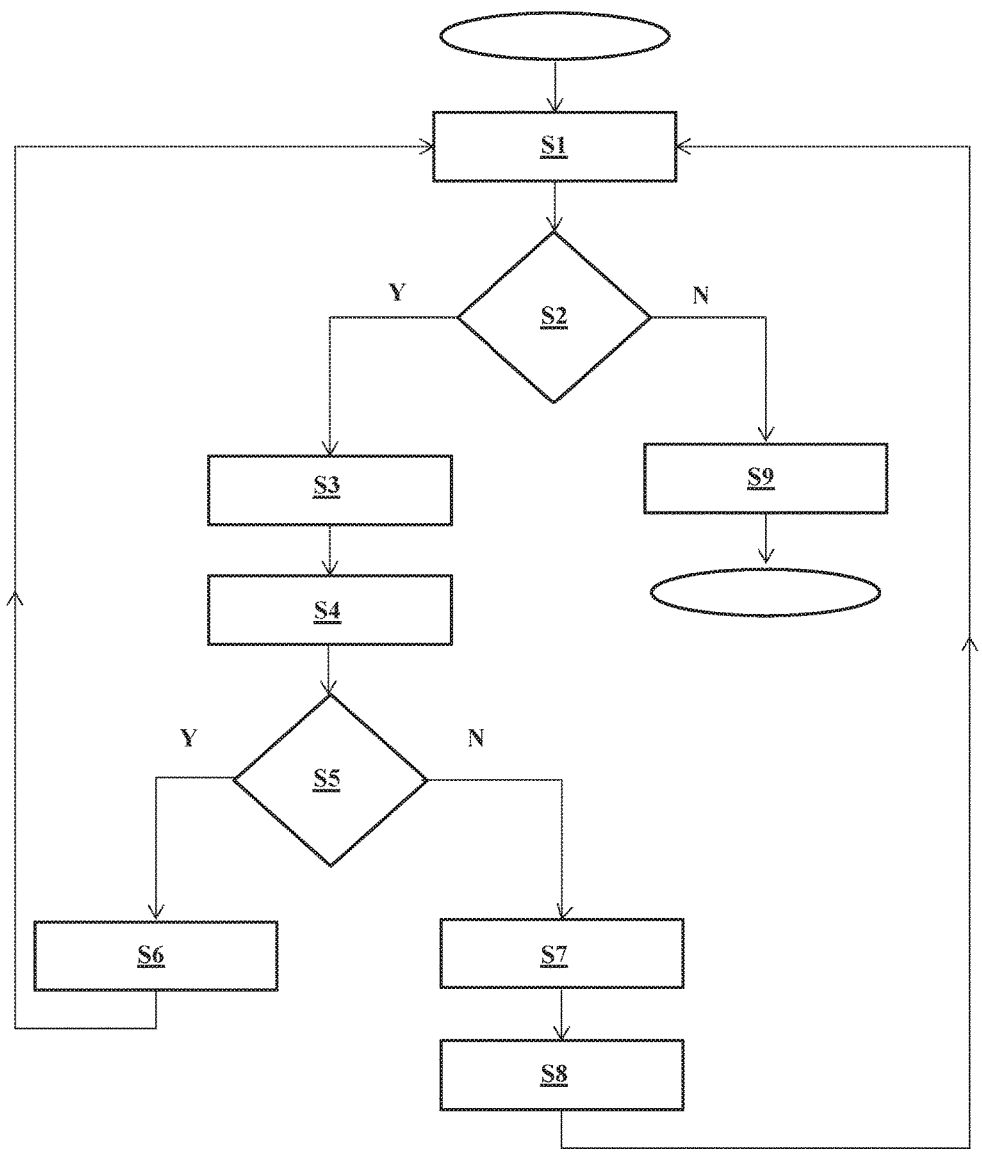
FIG. 5 is a flowchart representing an embodiment of a method of operating the internal combustion engine of FIG. 3.

As shown in FIG. 4, the by-pass duct 515 may include an inner layer 515.1 and an outer layer 515.2, wherein the inner layer 515.1 has a thermal conductivity greater than the outer layer 515.2. For instance, the outer layer 515.2 has a structural resistance greater than the inner layer 515.1. In the example shown in FIGS. 4A and 4B, the inner layer 515.1 and the outer layer 515.2 have a circular cross-section, but any other shape may be selected. The inner layer 515.1 is coaxially arranged relative to the outer layer 515.2. By way of an example, the inner layer 515.1 may be thinner than the outer layer 515.2. The inner layer 515.1 may be made of a material different or equal to the material of the outer layer 515.2. The inner layer 515.1 has an inner surface in (direct) contact with the gas flowing therein.

In the example shown in FIG. 4A, for instance, the outer surface of the inner layer 515.1 is in contact with the inner surface of the outer layer 515.2, in practice, the inner layer 515.1 is fitted into the outer layer 515.2. By way of an alternative example shown in FIG. 4B, the outer surface of the inner layer 515.1 is spaced apart from the inner surface of the outer layer 515.2, in practice between the inner layer 515.1 and the outer layer 515.2 may be included an intermediate (empty) space 515.3, wherein for instance air is provided.

Again, the ICE 110 includes an air recirculation pipe 700 fluidly connecting the air intake duct 205 downstream of the compressor 240 and at least one of the main and the bypass duct of the LP-EGR pipe 500, in particular the by-pass duct 515 of the LP-EGR pipe 500. More in detail, the air recirculation pipe 700 branches from a point of the intake duct 205 located downstream of the compressor 240, particularly upstream of the intercooler 260, and leads in a point of the LP-EGR pipe 500, particularly downstream of the LP-EGR valve 520 and more in detail in a point (proximal to the LP-EGR valve 520) of the by-pass duct 515.

An air recirculation valve 705 is disposed in the air recirculation pipe 700. The air recirculation valve 705 may include a movable valve member and an electrical actuator that moves the valve member to regulate a mass flow rate of the air in the air recirculation pipe 700 among an open position, a closed position and, for instance, any position between the open and the closed positions.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340 located in the intake duct 205 upstream of the LP-EGR valve 520, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, a HP-EGR temperature sensor 440, a LP-EGR temperature sensor 525, for instance provided on the by-pass duct 515 of the LP-EGR pipe 500 and suitable to sense the temperature of the wall (for instance the inner layer 515.1 or the outer layer 515.2) of the by-pass duct 515, a coolant temperature sensor 625, which may be present on the coolant circuit 600, and an accelerator pedal position sensor 445. Furthermore, the ECU 450 may generate output signals to various control devices that are arranged to control the operation of the ICE 110, including, but not limited to, the fuel injectors 160, the intake valve actuator 332, the HP-EGR valve actuator, the LP-EGR valve actuator 522, the air recirculation valve 705 (namely the valve actuator thereof), the VGT actuator 290, and/or the exhaust gas cam phaser and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analogue and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an on-board computer, or any processing module that might be deployed in the vehicle.

The ECU 450 may be configured to perform a condensation preventing strategy which interrupts a flowing of exhaust gas through the EGR pipe 500 if a condensation in the exhaust gas or the mixture of fresh air and exhaust gas supplied to the compressor 240 is expected.

For example, a condensation of the exhaust gases may occur due to the lowering of the temperature of the exhaust gas to or below the dew point thereof. Cooling of exhaust gas passing through the by-pass duct 515 or the LP-EGR cooler 510 of the LP-EGR pipe 500 may lower the temperature of the exhaust gas to or below the dew point of the exhaust gas. Again, fresh air being drawn through the throttle body 330 mixes with (relatively) warm exhaust gas from the LP-EGR valve 520 and the temperature of the fresh air/exhaust gas mixture may be less than the dew point of the mixture.

Condensation droplets may cause corrosion and erosion of various components of the ICE 110 that are contacted by the condensation droplets, in particular the wheel of the compressor 240. An aim of the preventing condensation strategy is that of preventing the condensation of the exhaust gas, for example in both the occurrences above disclosed. It is observed that when the temperature value of the wall of the LP-EGR pipe 500 is too low, namely below the dew point of the exhaust gas, a condensation of the exhaust gases may occur on the inner wall of the LP-EGR pipe 500, namely the main duct 505 or the by-pass duct 515. Another aim of the preventing condensation strategy is that of allowing a fast activation of the exhaust gas recirculation through the EGR pipe 500 in a safe condition, namely in a condition where the risk of droplets condensation is averted.

According to the condensation preventing strategy, the ECU 450 may be configured to determine (block S1) a value of the coolant temperature, by way of an example the ECU 450 is configured to measure, by means of the coolant temperature sensor 625, the value of the coolant temperature. By way of an alternative the coolant temperature may be estimated, as known for the skilled person, for example on the basis of engine operating points (i.e. engine speed and engine torque).

Again, the ECU 450 is configured to compare (block S2) the determined value of the coolant temperature with a first threshold value thereof. The first threshold value may be determined by means of tests performed during a calibration phase of the ICE 110 and stored in the memory system. For example, the first threshold value may be representative of the temperature of the mixture of fresh air and recirculated exhaust gas above which there is no condensation of the mixture.

If the determined value of the coolant temperature is lower than the first threshold value, then a potential condensation upstream of the compressor 240 may occur, therefore the condensation preventing strategy provide for the ECU 450 to interrupt (block S3) the flowing of exhaust gas through the EGR pipe 500. The interruption of the flowing of exhaust gas through the EGR pipe 500 can be commanded by the ECU 450 by actuating and regulating the valve member 521 of the LP-EGR valve 520. In particular, the ECU 450 operates the LP-EGR valve 520 in the closed position thereof, which closes both the main duct 505 and the by-pass duct 515.

Again, according to the condensation preventing strategy, when the coolant temperature is again lower than the first threshold value, the ECU 450 may be configured to determine (block S4) a value of the wall temperature of the by-pass duct 515, by way of an example the ECU 450 is configured to measure, by the LP-EGR temperature sensor 525, the value of the wall temperature. By way of an alternative, the value of the wall temperature may be estimated, as known to those skilled in art, for example on the basis of engine operating points (i.e. engine speed and engine torque) or on the basis of the value of the ambient environment temperature.

Again, the ECU 450 is configured to compare (block S5) the determined value of the wall temperature with a second threshold value thereof. The second threshold value may be determined by tests performed during a calibration phase of the ICE 110 and stored in the memory system. The second threshold value may be a temperature value which is representative of the temperature of the wall (i.e. the inner layer 515.1) of the by-pass duct 515 above which no condensation is observed along the by-pass duct 515 in the exhaust gas recirculated through the by-pass duct 515.

If the determined value of the wall temperature is lower than the second threshold value, then a potential condensation upstream of the compressor 240 in the by-pass duct 515 (and or in the main duct 505) may occur, therefore the condensation preventing strategy provide for the ECU 450 to maintain the interruption of the flowing of exhaust gas through the EGR pipe 500, but recirculating to the compressor 240 part of compressed air exiting from the compressor 240 via the by-pass duct 515. In practice, if the determined value of the wall temperature is lower than the second threshold value, the ECU 450 is configured to maintain the LP-EGR valve 520 in the closed position thereof, which closes the main duct 505 and the by-pass duct 515.

At the same time, the condensation preventing strategy provides for the ECU 450 to operate (block S6) the air recirculation valve 705 in an open position thereof, which at least partially opens the air recirculation pipe 700. In this situation, at least a part of the compressed air exiting from the compressor 240 is recirculated to the compressor 240 via the by-pass duct 515, allowing a safe warm-up of the by-pass duct 515. As a matter of fact, the compressed air has a higher temperature of the environment ambient air, due to the compression, and a lower content of condensable vapors than the exhaust gas, therefore the condensation risks are averted during the initial warm-up phase of the ICE 110, until the wall temperature of the by-pass duct 515 increases up to the second threshold value thereof.

Moreover, this air recirculation condition implies a higher work of the compressor 240, to compensate the air leakage caused by the opening of the air recirculation pipe 700, and therefore a higher temperature of the compressed air exiting from the compressor 240 may be achieved, allowing a fast warm-up of the by-pass duct 515 temperature.

Again, the inner layer 515.1, due to its greater thermal conductivity, may faster increase the temperature of its inner surface which is in contact with the flowing gas (in this condition the compressed air), allowing an even faster warm-up of the by-pass duct 515 temperature.

The condensation preventing strategy may provide for the ECU 450 to monitor (continuously determine) the wall temperature until the wall temperature increases up to the second threshold value thereof. If the determined value of the wall temperature gets higher than the second threshold value, the condensation preventing strategy may provide for the ECU 450 to operate (block S7) the air recirculation valve 705 in the closed position thereof, which closes the air recirculation pipe 700. At the same time, if the determined value of the wall temperature gets higher than the second threshold value, the condensation preventing strategy provides for the ECU 450 to actuate (block S8) the LP-EGR valve 520 in the first open position thereof, which opens the by-pass duct 515 (only), fluidly connecting the upstream section of the LP-EGR pipe 500 and the by-pass 515 only. In practice, in this condition a part of exhaust gas may safely recirculate through the LP-EGR pipe 500 and the by-pass duct 515 thereof, preventing the flowing of the exhaust gas through the main duct 505 and the LP-EGR cooler 510.

The previous flowing of the compressed air obtained when the air recirculation valve 705 was open increased the temperature value of the by-pass duct 515 walls up to the second threshold value, preventing the droplets condensation of the exhaust gas once the LP-EGR valve 520 is turned in the first open position thereof. Once the wall temperature is higher than the second threshold value, the condensation preventing strategy may provide for the ECU 450 to monitor (continuously determine) the coolant temperature until the coolant temperature increases up to the first threshold value thereof.

If the determined value of the coolant temperature gets higher than the first threshold value, the condensation preventing strategy provides for the ECU 450 to maintain the air recirculation valve 705 in the closed position thereof, which closes the air recirculation pipe 700. Moreover, if the determined value of the coolant temperature is higher than the first threshold value, the condensation preventing strategy provides for the ECU 450 to actuate (block S9) the LP-EGR valve 520 in the second open position thereof, which opens the main duct 505 (only) fluidly connecting the upstream section of the LP-EGR pipe 500 and the main duct 505 only. In practice, in this condition a part of exhaust gas may safely recirculate through the LP-EGR pipe 500 and the main duct 505 (namely, through the LP-EGR cooler 510) thereof, preventing the flowing of the exhaust gas through the by-pass duct 515.

In practice, thanks to the proposed solution, when a potential condensation of the exhaust gas along the LP-EGR pipe 500 (the main duct 505 and/or the by-pass duct 515) is estimated, the LP-EGR system may be deactivated and the exhaust gas recirculation prevented through LP-EGR pipe 500, but a flow of compressed air may be deviated by the intake duct 205 to be directed into a portion of the LP-EGR pipe 500 (namely, into the by-pass duct 515) in order to preheat the same portion before flowing the exhaust gas via this preheated portion. This solution may reduce the usage of the HP-EGR system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an internal combustion engine having a turbocharger; an exhaust gas recirculation pipe with an exhaust gas cooler therein fluidly connecting an exhaust gas line downstream of a turbine of the turbocharger to an air intake duct upstream of a compressor of the turbocharger; an EGR valve for adjusting exhaust gas to be delivered to the exhaust gas recirculation pipe and an EGR cooler bypass pipe; an air recirculation valve positioned in an air recirculation pipe; a controller; a first sensor; and a second sensor, the method comprising:
    determining a first temperature of a portion of the EGR cooler bypass pipe by the first sensor;
    determining a second temperature of a coolant in the exhaust gas cooler by the second sensor;
    actuating the EGR valve by the controller to prevent exhaust gas recirculation via the exhaust gas recirculation pipe when the first temperature is lower than a first predetermined threshold value; and
    opening the air recirculation valve by the controller to recirculate to the air intake duct part of compressed air exiting from the compressor via the portion of the exhaust gas recirculation pipe; and
    closing the air recirculation valve by the controller to prevent compressed air recirculation through the portion of the EGR cooler bypass pipe and actuating the EGR valve by the controller to direct exhaust gas to the intake duct via only the EGR cooler bypass pipe when the second temperature lower than a second predetermined threshold value and when the first temperature is higher than the first predetermined threshold value.

2. The method according to claim 1, wherein the step of determining the first temperature by the first sensor includes determining the temperature of a wall of the EGR cooler bypass pipe.

3. The method according to claim 1, further comprising:
    closing the air recirculation valve by the controller to prevent compressed air recirculation through the portion of EGR cooler bypass pipe and actuating the EGR valve by the controller to direct exhaust gas to the intake duct via only to the exhaust gas recirculation pipe with the exhaust gas cooler therein when the second temperature is higher than the second predetermined threshold value.

4. A non-transitory computer readable medium comprising a computer program, performing the method according to claim 1.

5. An internal combustion engine comprising:

a turbocharger having a compressor and a turbine;

an exhaust gas recirculation pipe fluidly connecting an exhaust gas line downstream of the turbine to an air intake duct upstream of the compressor;

an exhaust gas cooler positioned in the exhaust gas recirculation pipe;

an exhaust gas recirculation valve position in the exhaust gas recirculation pipe upstream of the exhaust gas cooler;

an exhaust gas cooler bypass line connected at a first point to the at the exhaust gas recirculation valve and at a second point downstream of the exhaust gas cooler;

an air recirculation pipe fluidly connecting the air intake duct downstream of the compressor to a portion of the exhaust gas cooler bypass line between the first point and the second point, the air recirculation line having an air recirculation valve positioned therein; and an electronic control unit including executable instructions stored a non-transitory memory configured to:

determine a first temperature of the portion of the exhaust gas cooler bypass line by a first sensor;

actuate the exhaust gas recirculation valve to close the exhaust gas recirculation pipe when the first temperature is lower than a first predetermined threshold value; and operate the air recirculation valve to open the air recirculation pipe and recirculate a portion of compressed air exiting from the compressor to the air intake duct via the portion of the exhaust gas cooler bypass line.

6. The internal combustion engine according to claim 5, wherein the electronic control unit is further configured to selectively position the exhaust gas recirculation valve between a closed position to prevent exhaust gas flow through both of the exhaust gas recirculation pipe and the exhaust gas cooler bypass line a first open position to allow exhaust gas flow through the exhaust gas cooler bypass line and to prevent exhaust gas flow through the exhaust gas recirculation pipe, and a second open position to prevent exhaust gas flow through the exhaust gas recirculation pipe and to allow exhaust gas flow through the exhaust gas cooler bypass line.

7. The internal combustion engine according to claim 6, wherein the electronic control unit is further configured to:

determine a second temperature of a coolant in the exhaust gas recirculation cooler; and actuate the exhaust gas recirculation valve to the first open position and actuate the air recirculation valve to close the air recirculation pipe when the second temperature is lower than a second predetermined threshold value and if the first temperature is higher than the first predetermined threshold value.

8. The internal combustion engine according to claim 7, wherein the electronic control unit is further configured to actuate the exhaust gas recirculation valve in the second open position when the second temperature is higher than the second predetermined threshold value.

9. The internal combustion engine according to claim 5, wherein the portion of the exhaust gas cooler bypass line comprises an inner layer and an outer layer, wherein the inner layer has a thermal conductivity greater than a thermal conductivity of the outer layer.

10. The internal combustion engine according to claim 9, wherein the inner layer and the outer layer are coaxially configured.

11. The internal combustion engine according to claim 9, wherein the outer layer is spaced apart from the inner layer to provide an intermediate space therebetween.

* * * * *